(12) United States Patent
Suematsu et al.

(10) Patent No.: US 8,116,594 B2
(45) Date of Patent: Feb. 14, 2012

(54) IMAGE PROCESSING APPARATUS, IMAGE PROCESSING METHOD, AND PROGRAM

(75) Inventors: Masayuki Suematsu, Chiba (JP); Takayuki Ohe, Saitama (JP); Masato Usuki, Kanagawa (JP); Masanari Yamamoto, Kanagawa (JP); Kenkichi Kobayashi, Tokyo (JP)

(73) Assignee: Sony Corporation (JP)

( * ) Notice: Subject to any disclaimer, the term of this patent is extended or adjusted under 35 U.S.C. 154(b) by 979 days.

(21) Appl. No.: 12/082,625

(22) Filed: Apr. 10, 2008

(65) Prior Publication Data

US 2008/0253692 A1 Oct. 16, 2008

(30) Foreign Application Priority Data

Apr. 13, 2007 (JP) ................ P2007-105541

(51) Int. Cl.
*G06K 9/32* (2006.01)

(52) U.S. Cl. ............... 382/300; 345/402.1; 345/413.1; 345/416.1; 345/699

(58) Field of Classification Search ........... 345/475, 345/606; 348/402.1, 413.1, 416.1, 699, E7.007, 348/E7.013, 538, E13.065, E7.012; 358/525; 375/240.16, E17.104, E17.106, E17.123, 375/E7.164, E7.256, E7.248, E7.25; 382/300; 386/271; 700/189, 252; 704/265; 708/290, 708/313, 847

See application file for complete search history.

(56) References Cited

U.S. PATENT DOCUMENTS

| | | | | |
|---|---|---|---|---|
| 4,668,986 A | * | 5/1987 | Furukawa | 348/416.1 |
| 5,121,202 A | * | 6/1992 | Tanoi | 375/240.16 |
| 5,754,246 A | * | 5/1998 | Flannaghan | 348/459 |
| 5,940,140 A | | 8/1999 | Dadourian et al. | |
| 6,625,214 B1 | * | 9/2003 | Umehara et al. | 375/240.12 |
| 2002/0031178 A1 | * | 3/2002 | Isozaki | 375/240.12 |
| 2004/0101058 A1 | * | 5/2004 | Sasai et al. | 375/240.26 |
| 2005/0184949 A1 | * | 8/2005 | Kamimura | 345/98 |

(Continued)

FOREIGN PATENT DOCUMENTS

JP 2001-042831 A 2/2001

(Continued)

OTHER PUBLICATIONS

Alexis Michael Tourapis, Feng Wu, and Shipeng Li, Direct Mode Coding for Bipredictive Slices in the H.264 Standard, Jan. 1995, IEEE Transactions on Circuits and Systems for Video Technology, vol. 15, No. 1.*

(Continued)

*Primary Examiner* — Gregory F Cunningham
(74) *Attorney, Agent, or Firm* — Lerner, David, Littenberg, Krumholz & Mentlik, LLP

(57) ABSTRACT

An image processing apparatus includes: a detecting unit configured to detect a motion vector from an input image signal acting as the image signal for each of chronologically input pixels; a determining unit configured to determine whether the input image signal in terms of a level meets a predetermined condition; and an interpolating unit configured such that if the input image signal is not found to meet the predetermined condition, then the interpolating unit interpolates and outputs an input image signal intermediate signal interposed at a predetermined point in time between the input image signal and a preceding input image signal that precedes the input image signal, in accordance with the motion vector, and if the input image signal is found to meet the predetermined condition, then the interpolating unit allows the input image signal to be output unchanged as the input image signal intermediate signal.

6 Claims, 10 Drawing Sheets

U.S. PATENT DOCUMENTS

2005/0286635 A1    12/2005   Kumar et al.

FOREIGN PATENT DOCUMENTS

JP           2002247355         8/2002

OTHER PUBLICATIONS

Li S et al: "Direct Mode Coding for Bipredictive Slices in the H.264 Standard" IEEE Transactions on Circuits and Systems for Video Technology, IEEE Service Center, Piscataway, NJ, US, vol. 15, No. 1, Jan. 1, 2005, pp. 119-126.

Jung J et al: "Competition-based scheme for motion vector selection and coding" ITU Study Group 16—Video Coding Experts Group, XX, XX, No. VCEG-ACO6, Jul. 17, 2006, pp. 1-8.

European Search Report, EP 08 15 4350, dated Apr. 21, 2011.

Sugiyama et al: A Picture Rate Covertion Scheme Using Fully Motion Compensated Interpolation pp. 75-76, IEEE 2005.

Tien Ying et al: Motion—Compensated Frame Interpolation Scheme for H.263 Codec vol. 4, pp. 491-494, IEEE 1999.

Communication from EP Application No. 08154350, dated Apr. 21, 2011.

* cited by examiner

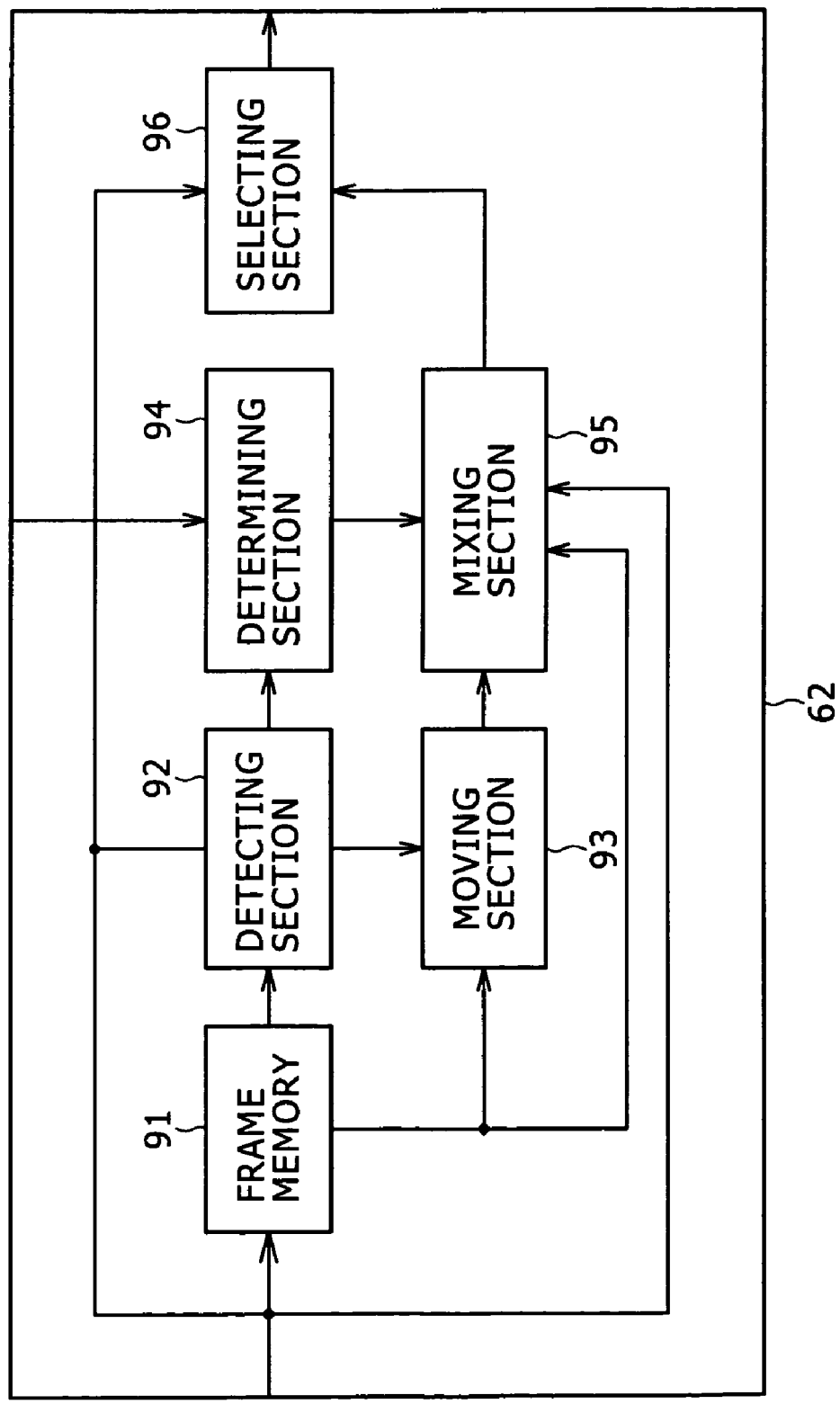

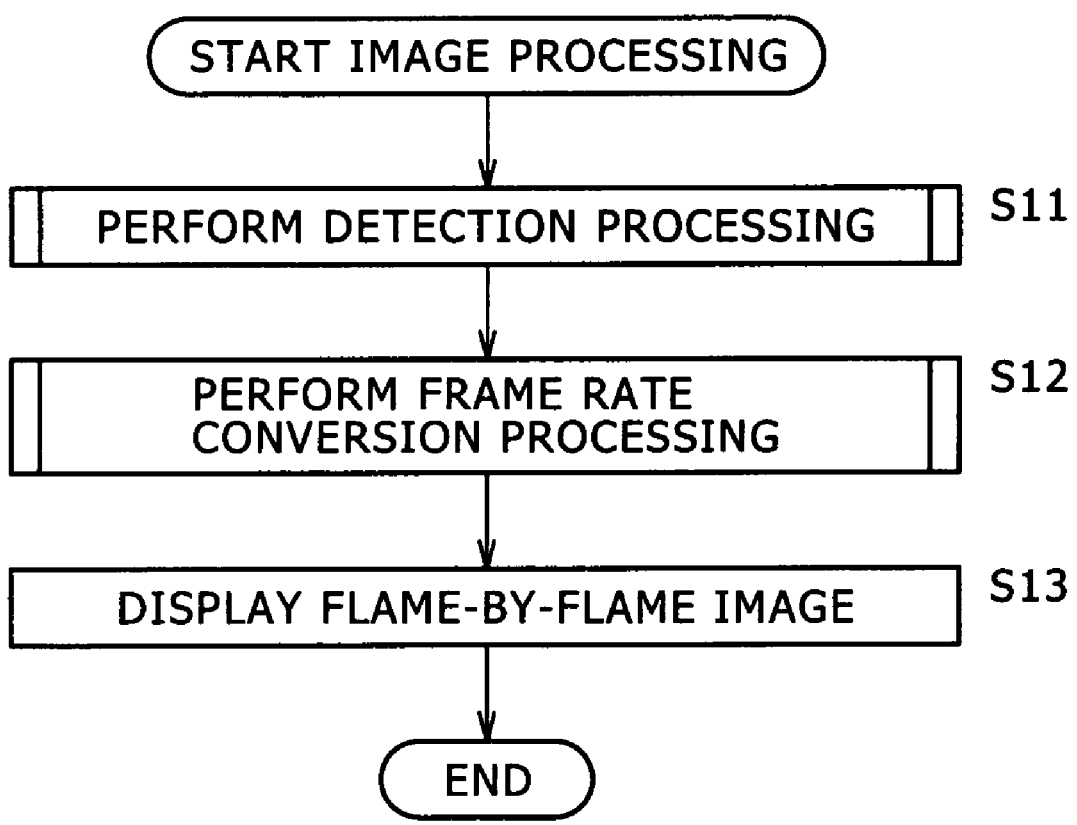

IMAGE PROCESSING APPARATUS, IMAGE PROCESSING METHOD, AND PROGRAM

CROSS REFERENCES CROSS-REFERENCE TO RELATED APPLICATIONS

The present application claims priority from Japanese Patent Application No. JP 2007-105541 filed in the Japanese Patent Office on Apr. 13, 2007, the entire contents content of which is incorporated herein by reference.

BACKGROUND OF THE INVENTION

1. Field of the Invention

The present invention relates to an image processing apparatus, an image processing method, and a program. More particularly, the invention relates to an image processing apparatus, an image processing method, and a program such that when image signals are interpolated based on their motion vector, the image quality of the interpolated image signal is improved.

2. Description of the Related Art

FIG. 1 schematically shows a typical structure of an ordinary image processing apparatus 1.

In FIG. 1, the image processing apparatus 1 is made up of a frame rate converting section 11, a panel driving section 12, and a display panel 13. In operation, the image processing apparatus 1 enhances for display purposes the frame rate of image signals that are pixel-specific digital signals representative of externally input, chronologically ordered frame-by-frame images.

Given an externally input image signal, the frame rate converting section 11 carries out a frame rate enhancement process for raising the frame rate (i.e. cycle) of the received image signal. More specifically, the frame rate converting section 13 first performs a frame interpolation process on the image signal supplied from the outside. The image signal resulting from the interpolation is output to the panel driving section 12 as an image signal that is interposed chronologically between externally input image signals. The process makes the frame rate of the input signal to the panel driving section 12 higher than the frame rate of the signal entering the frame rate converting section 11.

The panel driving section 12 performs D/A (digital/analog) conversion and other processes on the image signal supplied by the frame rate converting section 11. The resulting analog signal is used by the panel driving section 12 to drive the display panel 13 such as a liquid crystal display (LCD) panel whereby frame-by-frame images are displayed.

The frame rate enhancement process performed by the frame rate converting section 11 in FIG. 1 is indispensable for improving the image quality of chronologically ordered image signals. The same holds true for frame interpolation used in the process for compensating the motions of such chronologically ordered image signals.

One way to implement the frame interpolation process involves first detecting a motion vector from chronologically input image signals and then using the detected motion vector to interpolate image signals at certain points in time between chronologically ordered image signals (as disclosed in Japanese Patent Laid-open No. 2001-42831).

The motion vector is detected illustratively using the so-called block matching method whereby chronologically ordered image signals are compared with one another. In cases such as when a rigid body is moving, the motion vector of the body is accurately detected.

SUMMARY OF THE INVENTION

On the other hand, where the level and the pixel count of image signals representing an object vary over time as in the case of a fade-in or fade-out, the motion vector involved is likely to be inaccurately detected. When the erroneously detected motion vector is used for image signal interpolation, the resulting image signal is bound to be inaccurate, which causes deterioration of the image quality of the image signal following interpolation.

The present embodiment has been made in view of the above circumstances and provides arrangements such that when image signals are interpolated based on their motion vector, the image quality of the interpolated image signal is improved.

According to one embodiment of the present invention, there is provided an image processing apparatus including a detecting unit configured to detect a motion vector from an input image signal acting as the image signal for each of chronologically input pixels, and a determining unit configured to determine whether the input image signal in terms of a level thereof meets a predetermined condition. The image processing apparatus further includes an interpolating unit configured such that if the input image signal is not found to meet the predetermined condition, then the interpolating unit interpolates and outputs an input image signal intermediate signal interposed at a predetermined point in time between the input image signal and a preceding input image signal that precedes the input image signal, in accordance with the motion vector, and if the input image signal is found to meet the predetermined condition, then the interpolating unit allows the input image signal to be output unchanged as the input image signal intermediate signal.

Preferably, the determining unit may determine whether the input image signal meets the predetermined condition based on a time-varied change in at least one of factors representing a maximum level of the input image signal, the number of pixels for which the input image signal is at a zero level, and a total level sum of the input image signal at varying points in time.

Preferably, if the number of pixels for which either the input image signal or the preceding input image signal is at a zero level is larger than a predetermined number, then the determining unit may determine whether the input image signal meets the predetermined condition based on a time-varied change in at least one of factors representing a maximum level of the input image signal, the number of pixels for which the input image signal is at a zero level, and a total level sum of the input image signal at varying points in time.

According to another embodiment of the present invention, there is provided an image processing method for use with an image processing apparatus for interpolating an input image signal acting as the image signal for each of chronologically input pixels, the image processing method including the steps of detecting a motion vector from the input image signal, and determining whether the input image signal in terms of a level thereof meets a predetermined condition. The image processing method further includes the steps of, if the input image signal is not found to meet the predetermined condition, then interpolating and outputting an input image signal intermediate signal interposed at a predetermined point in time between the input image signal and a preceding input image signal that precedes the input image signal, in accordance with the motion vector, and if the input image signal is found to meet the predetermined condition, then allowing the input image signal to be output unchanged as the input image signal intermediate signal.

According to a further embodiment of the present invention, there is provided a program for causing a computer to perform an image processing procedure for interpolating an input image signal acting as the image signal for each of chronologically input pixels, the image processing procedure including the steps of detecting a motion vector from the input image signal, and determining whether the input image signal in terms of a level thereof meets a predetermined condition. The image processing procedure further includes the steps of, if the input image signal is not found to meet the predetermined condition, then interpolating and outputting an input image signal intermediate signal interposed at a predetermined point in time between the input image signal and a preceding input image signal that precedes the input image signal, in accordance with the motion vector, and if the input image signal is found to meet the predetermined condition, then allowing the input image signal to be output unchanged as the input image signal intermediate signal.

Where the image processing apparatus, image processing method, or program of the present embodiment is in use, a motion vector is first detected from an input image signal acting as the image signal for each of chronologically input pixels. A check is then made to determine whether the input image signal in terms of a level thereof meets a predetermined condition. If the input image signal is not found to meet the predetermined condition, then an input image signal intermediate signal is interpolated and output as the signal interposed at a predetermined point in time between the input image signal and a preceding input image signal that precedes the input image signal, in accordance with the motion vector. If the input image signal is found to meet the predetermined condition, then the input image signal is allowed to be output unchanged as the input image signal intermediate signal.

According to the embodiments of the present invention outlined above, when image signals are interpolated based on their motion vector, the image quality of the interpolated image signal is enhanced.

BRIEF DESCRIPTION OF THE DRAWINGS

Further advantages of the present embodiment will become apparent upon a reading of the following description and appended drawings in which:

FIG. 5 is a block diagram showing a detailed structure of the frame rate converting section included in FIG. 3;

FIG. 7 is a flowchart of steps constituting the image processing performed by the receiving apparatus of FIG. 2;

DETAILED DESCRIPTION OF THE PREFERRED EMBODIMENTS

Figure 1:
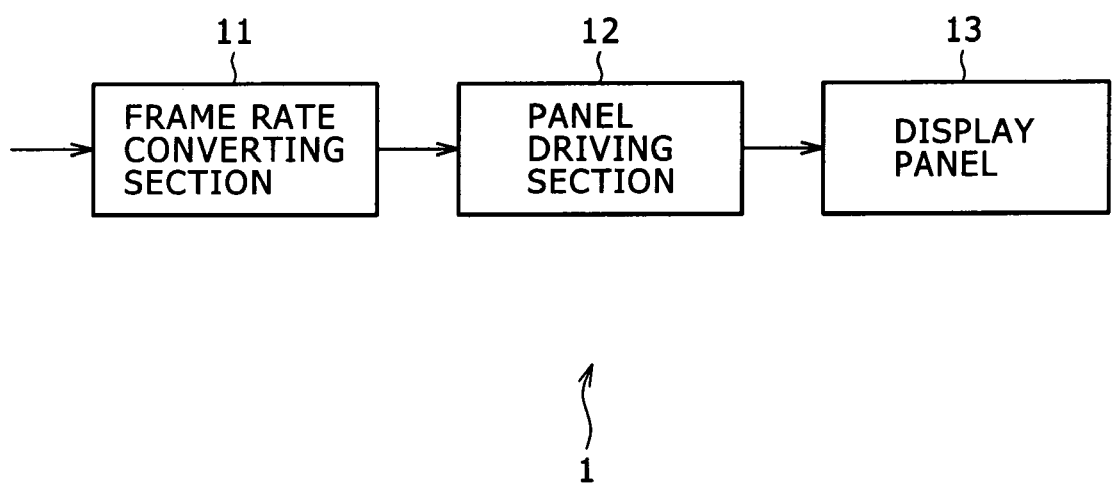
FIG. 1 is a block diagram showing a typical structure of an ordinary image processing apparatus.

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not mean that the example in question has no relevance to the claims. Conversely, if any example of the embodiment depicted hereunder has a specifically corresponding claim, this does not mean that the example in question is limited to that claim or has no relevance to other claims.

One embodiment of the present invention is an image processing apparatus (e.g., receiving apparatus 30 in FIG. 2) including: a detecting section (e.g., detecting section 92 in FIG. 5) configured to detect a motion vector from an input image signal acting as the image signal for each of chronologically input pixels; a determining section (e.g., determining section 82 in FIG. 4) configured to determine whether the input image signal in terms of a level thereof meets a predetermined condition; and an interpolating unit (e.g., mixing section 95 in FIG. 5) configured such that if the input image signal is not found to meet the predetermined condition, then the interpolating section interpolates and outputs an input image signal intermediate signal interposed at a predetermined point in time between the input image signal and a preceding input image signal that precedes the input image signal, in accordance with the motion vector; and if the input image signal is found to meet the predetermined condition, then the interpolating section allows the input image signal to be output unchanged as the input image signal intermediate signal.

Another embodiment of the present invention is an image processing method for use with an image processing apparatus (e.g., receiving apparatus 30 in FIG. 2) for interpolating an input image signal acting as the image signal for each of chronologically input pixels, the image processing method including the steps of: detecting (e.g., in step S84 of FIG. 11) a motion vector from the input image signal; determining (e.g., in step S86 of FIG. 11) whether the input image signal in terms of a level thereof meets a predetermined condition; if the input image signal is not found to meet the predetermined condition, then interpolating and outputting (e.g., in step S89 of FIG. 11) an input image signal intermediate signal interposed at a predetermined point in time between the input image signal and a preceding input image signal that precedes the input image signal, in accordance with the motion vector; and if the input image signal is found to meet the predetermined condition, then allowing (in step S91 of FIG. 11) the input image signal to be output unchanged as the input image signal intermediate signal.

Some preferred embodiments of the present invention will now be described in detail with reference to the accompanying drawings.

Figure 2:
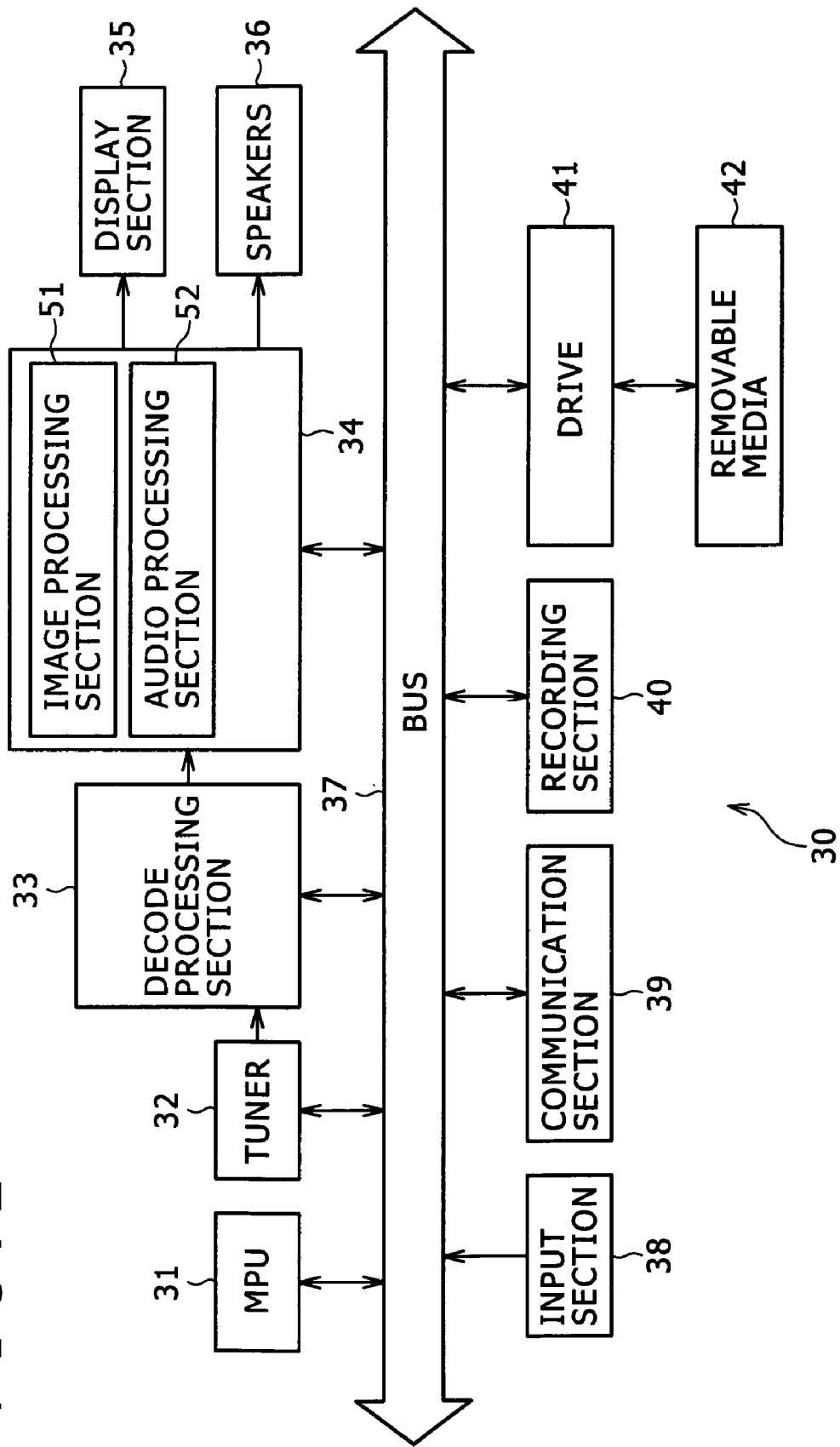
FIG. 2 is a block diagram showing a typical structure of a receiving apparatus according to the present embodiment.

FIG. 2 schematically shows a typical structure of the receiving apparatus 30 practiced as one embodiment of the present invention.

In FIG. 2, the receiving apparatus 30 includes an MPU (micro processing unit) 31, a tuner 32, a decode processing section 33, a signal processing section 34 connected to a display section 35 and speakers 36, an input section 38, a communication section 39, a recording section 40, and a drive 41, all interconnected via a bus 37. In operation, the receiving apparatus 30 receives radio waves of digital signals which represent the pixels of chronologically ordered frame-by-frame images of TV programs and which are subject to fade-in and fade-out effects as needed, as well as digital signals of sounds accompanying the images, and outputs the images and sounds of the received TV programs (the digital signals may be called the program signals hereunder).

The MPU 31 performs various processes in response to commands entered through the input section 38, by executing programs that are installed illustratively in the recording section 40. For example, given the command to display the program of a user-designated TV channel, the MPU 31 controls the tuner 32, decode processing section 33, and signal processing section 34 to have the images of the program displayed on the display section 35 and have the sounds of the program output from the speakers 36.

As needed, the MPU 31 installs into the recording section 40 the programs downloaded through the communication section 39 or the programs that are held on removable media 42 such as magnetic disks, optical disks, magnetic optical disks, or semiconductor memory. A piece of the removable media 42 is attached to and driven by the drive 41 for program installation.

Under control of the MPU 31, the tuner 32 receives and demodulates the radio waves which carry the program signal of a user-designated TV channel and which are emitted by a broadcasting station, not shown. Following the demodulation, the tuner 32 supplies the resulting program signal to the decode processing section 33.

Under control of the MPU 31, the decode processing section 33 decodes the encoded program signal coming from the tuner 32, in accordance with an appropriate standard such as MPEG-2 (Moving Picture Experts Group Phase 2). The decoded program signal is forwarded to the signal processing section 34.

The signal processing section 34 is made up of an image processing section 51 and an audio processing section 52. The image processing section 51 performs such processes as interpolation and D/A conversion on the image signal derived from the program signal supplied by the decode processing section 33. The interpolation involves having an image signal interposed chronologically between two consecutive image signals. The image processing section 51 supplies the display section 35 with the image signal that is an analog signal resulting from the preceding processes. The display section 35 in turn displays images based on the received image signal.

The audio processing section 52 performs D/A conversion on the audio signal derived from the program signal supplied by the decode processing section 33. The resulting audio signal in analog form is fed to the speakers 36 for audio output to the outside.

The input section 38 is illustratively made up of buttons, a keyboard, a mouse, switches, and a receiving unit that receives commands sent from a remote controller, not shown. In response to the user's operations, the input section 38 issues diverse commands to the MPU 31 via the bus 37. For example, given the user's operation of having the TV program of a user-designated channel displayed, the input section 38 supplies the MPU 31 with the command to get the program displayed.

The communication section 39 sends and receives diverse kinds of data over a network such as the Internet, not shown. Illustratively, the communication section 39 downloads suitable programs illustratively from a server, not shown, over the network and feeds the downloaded programs to the MPU 31.

The recording section 40 records the programs and/or data to be executed and/or operated on by the MPU 31 as needed.

A piece of removable media 42 is loaded as needed into the drive 41. The drive 41 drives the loaded medium, retrieves programs or data from the medium being driven, and sends what has been retrieved to the MPU 31 over the bus 37.

Figure 3:
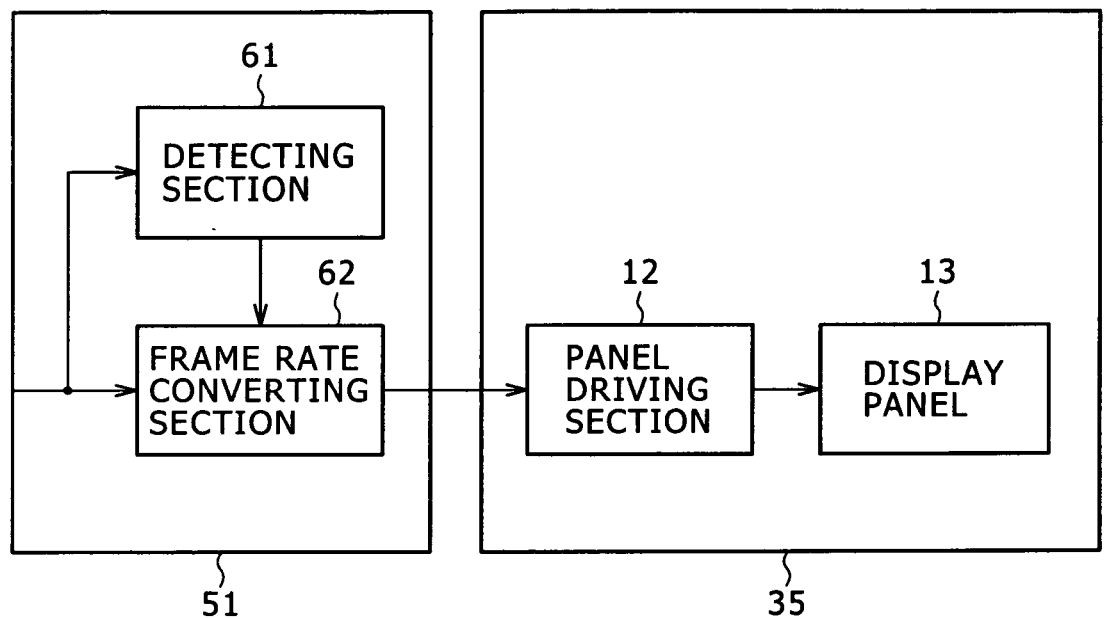
FIG. 3 is a block diagram showing detailed structures of the image processing section and display section included in FIG. 2.

FIG. 3 shows detailed structures of the image processing section 51 and display section 35 of the receiving apparatus 30 in FIG. 2.

As shown in FIG. 3, the image processing section 51 is constituted by a detecting section 61 and a frame rate converting section 62, and the display section 35 is formed by the panel driving section 12 and display panel 13. Of the reference numerals used in FIG. 3, those already found in FIG. 1 designate like or corresponding parts, and their descriptions will be omitted where redundant.

The image signal derived from the program signal supplied by the decode processing section 33 is sent as an input image signal to the detecting section 61 and frame rate converting section 62 in the image processing section 51. Based on the level of the input image signal, the detecting section 61 detects whether the input image signal meets the condition of a fade-in or a fade-out operation. That is, the detecting section 61 checks the level of the input image signal to determine whether the input image signal is subject to fade-in or fade-out.

If the input image signal is found to be subject to fade-in or fade-out, then the detecting section 61 supplies the frame rate converting section 62 with a fade-in or fade-out signal indicating that the input image signal in question is subject to fade-in or fade-out. The detecting section 61 will be discussed later in more detail with reference to FIG. 4.

In response to the fade-in or fade-out signal coming from the detecting section 61, the frame rate converting section 62 interpolates the input image signal in order to convert its frame rate. The interpolated input image signal is sent by the frame rate converting section 62 to the panel driving section 12 of the display section 35 whereby frame-by-frame images are displayed on the display panel 13. The frame rate converting section 62 will be described later in more detail with reference to FIG. 5.

Figure 4:
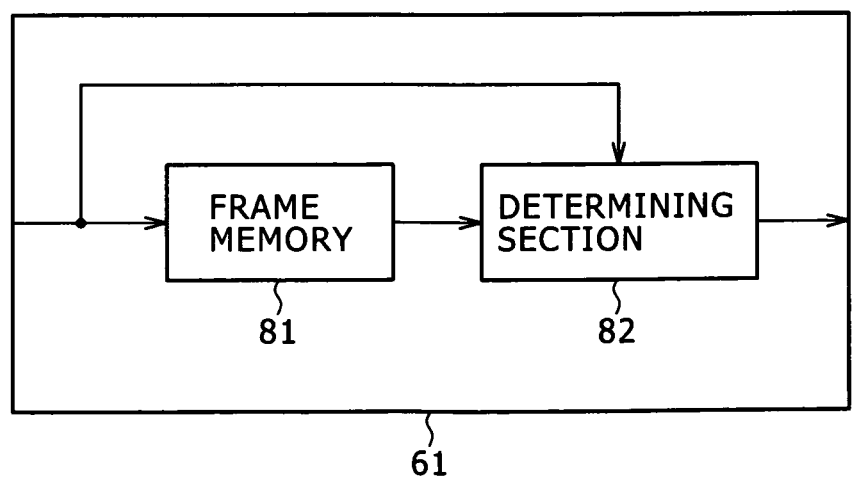
FIG. 4 is a block diagram showing a detailed structure of the detecting section included in FIG. 3.

FIG. 4 shows a detailed structure of the detecting section 61 in FIG. 3.

In FIG. 4, the detecting section 61 is made up of a frame memory 81 and a determining section 82. The input image signal supplied by the decode processing section 33 (FIG. 2) to the detecting section 61 is forwarded to both the frame memory 81 and the determining section 82.

The frame memory 81 stores the input image signal from the decode processing section 33. The determining section 82 reads the input image signal that is held in the frame memory 81. Using the retrieved input image signal and the input image signal coming from the decode processing section 33, the determining section 82 detects a time-varied change in the factors representing a maximum level of the input image signal, the number of pixels for which the input image signal is at a zero level, and a total level sum of the input image signal at varying points in time.

Based on the result of the detection, the determining section 82 determines whether the input image signal is subject to fade-in or fade-out. If the input image signal is found to be subject to fade-in or fade-out, then the determining section 82 outputs a fade-in or fade-out signal to the frame rate converting section 62.

FIG. 5 shows a detailed structure of the frame rate converting section 62 in FIG. 3.

In FIG. 5, the frame rate converting section 62 is made up of a frame memory 91, a detecting section 92, a moving section 93, a determining section 94, a mixing section 95, and a selecting section 96.

The input image signal supplied by the decode processing section 33 in FIG. 2 is sent to the frame memory 91, detecting section 92, mixing section 95, and selecting section 96. The fade-in or fade-out signal supplied by the determining section 82 of the detecting section 61 in FIG. 4 is forwarded to the determining section 94.

The frame memory 91 stores input image signals coming from the decode processing section 33 on a frame-by-frame basis. In operation, the frame memory 91 reads the previously stored input image signal, i.e., the input image signal one frame interval earlier than the input image signal coming from the decode processing section 33. The retrieved input image signal is supplied to the detecting section 92, moving section 93, and mixing section 95.

The detecting section 92 regards the input image signal coming from the decode processing section 33 as the target input image signal to be interpolated (called the interpolation target signal hereunder). The detecting section 92 proceeds to detect a motion vector from the interpolation target signal based both on that interpolation target signal and on the input image signal one frame interval earlier (called the preceding interpolation target signal hereunder) than the interpolation target signal supplied by the frame memory 91.

Illustratively, using the block matching method, the detecting section 92 detects a block-by-block motion vector by matching a base block set for the interpolation target signal with a reference block which is the same in size as the base block and which is set for the preceding interpolation target signal. The detecting section 92 feeds the detected block-by-block motion vector to the moving section 93 and determining section 94.

The moving section 93 moves the preceding interpolation target signal coming from the frame memory 91 on a block-by-block basis through the use of the block-by-block motion vector supplied by the detecting section 92. The preceding interpolation target signal thus moved is sent to the mixing section 95.

The determining section 94 determines the degree of confidence of the block-by-block motion vector based on the block-by-block motion vector value given by the detecting section 92. Alternatively, the confidence of the block-by-block motion vector may be determined not on the basis of its value but based on the block-by-block integral of the differences between corresponding pixels in the base block and reference block used for the calculation of the motion vector.

If a fade-in/out signal for the interpolation target signal is input from the determining section 82 in FIG. 4, the determining section 94 supplies the mixing section 95 with no-mix information indicating that mixing will not be performed. If the fade-in/out signal for the interpolation target signal is not input, then the determining section 94 determines the ratio at which to mix the interpolation target signal with the preceding interpolation target signal on a block-by-block basis (the ratio will be called the mixing ratio hereunder), in accordance with the block-by-block degree of confidence. Thereafter, the determining section 94 supplies the block-by-block mixing ratio to the mixing section 95.

Based on the mixing ratio from the determining section 94, the mixing section 95 mixes the interpolation target signal supplied by the decode processing section 33 with the moved preceding interpolation target signal given by the moving section 93. The mixing section 95 proceeds to supply the selecting section 96 with the mixed image signal as an interpolation signal interpolating an image signal interposed chronologically between the interpolation target signal and the preceding interpolation target signal.

As described, when the mixing ratio is determined by the determining section 94, the mixing section 95 provides interpolation based on the determined mixing ratio by mixing the interpolation target signal with the preceding interpolation target signal moved by the moving section 93 using the motion vector. That is, where the fade-in/out signal is not input, the frame rate converting section 62 performs the usual interpolation process involving interpolation of image signals by use of motion vectors.

Given the no-mix information from the determining section 94, the mixing section 95 allows the preceding interpolation target signal coming from the frame memory 91 to be output unchanged as the interpolation signal destined for the selecting section 96. That is, where the fade-in/out signal is input, the frame rate converting section 62 performs a preliminary interpolation process causing the preceding interpolation target signal to be used as the interpolation signal without modification.

As described, where the motion vector is highly likely to be erroneously detected because the interpolation target signal is subject to fade-in or fade-out, the frame rate converting section 62 does not perform interpolation based on the motion vector. In that case, the preceding interpolation target signal is used unchanged as the interpolation signal. This makes it possible to prevent the generation of an inaccurate interpolation signal and to improve the image quality of the interpolated image signal.

The selecting section 96 selects either the interpolation target signal supplied by the decode processing section 33 or the interpolation signal coming from the mixing section 95, and outputs the selected signal as the interpolated image signal in a suitably timed manner. More specifically, between the interpolation target signal and another target input image signal that follows it, the selecting section 96 creates an interpolation signal using the two signals and outputs the created signal as the interpolated image signal. As a result, the frame rate of the interpolated image signal output by the selecting section 96 becomes twice as high as the frame rate of the input image signal.

Figure 6A:
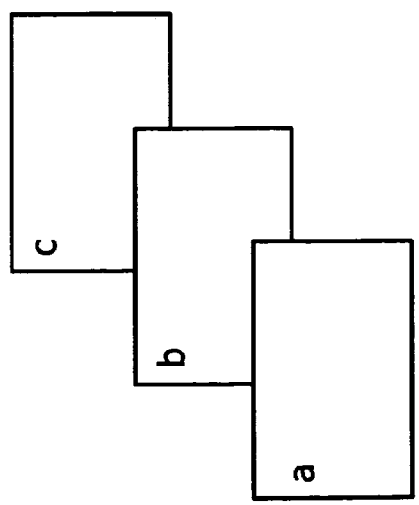
FIGS. 6A, 6B and 6C are schematic views explanatory of preliminary and usual interpolation processing.
Figure 6B:
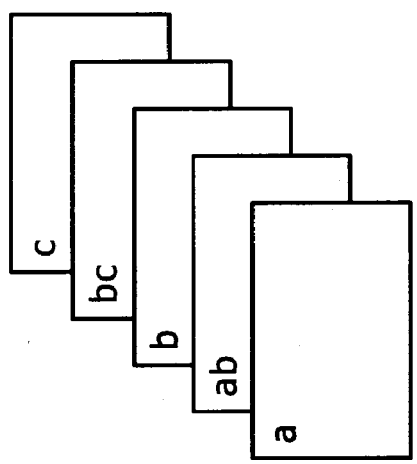
Figure 6C:
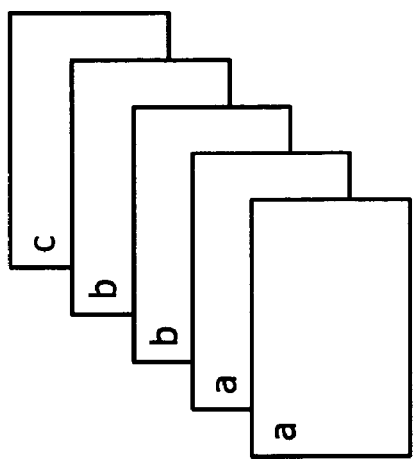

Described below with reference to FIGS. 6A through 6C is how the frame rate converting section 62 carries out preliminary and usual interpolation processing.

As shown in FIG. 6A, it is assumed that three consecutive frames are represented by input images signals a, b and c which are input successively to the frame rate converting section 62.

In usual interpolation, if the input image signal b is regarded as the interpolation target signal, then the mixing ratio corresponding to the motion vector of the input image signal b is used to mix the input image signal b as the interpolation target signal with the input image signal a as the preceding interpolation target signal moved as per the motion vector. This creates an interpolation signal ab interposed chronologically between the input image signal a and the input image signal b, as shown in FIG. 6B. Likewise, if the input image signal c is considered the interpolation target signal, then the mixing ratio corresponding to the motion vector of the input image signal c is used to create an interpolation signal bc that is interposed chronologically between the input image signal b and the input image signal c, as shown in FIG. 6B.

On the other hand, in preliminary interpolation, if the input image signal b is regarded as the interpolation target signal, then the input image signal a as the preceding interpolation target signal is allowed to become the interpolation signal without modification, as shown in FIG. 6C. Likewise, if the input image signal c is considered the interpolation target signal, then the input image signal b as the preceding interpolation target signal is used unmodified as the interpolation signal, as shown in FIG. 6C.

Described below with reference to FIG. 7 is the image processing performed by the receiving apparatus 30 in FIG. 2. The image processing is started illustratively when an input image signal is received from the decode processing section 33.

In step S11, the detecting section 61 of the image processing section 51 performs detection processing by checking the level of the input image signal coming from the decode processing section 33 to determine whether the input image signal is subject to fade-in or fade-out. The detection processing will be discussed later in more detail with reference to FIG. 8.

In step S12, the frame rate converting section 62 carries out frame rate conversion processing that involves converting the frame rate of the input image signal. The frame rate conversion processing will be described later in more detail with reference to FIG. 11.

In step S13, the panel driving section 12 performs D/A conversion on the interpolated image signal supplied by the frame rate converting section 62. The analog signal resulting from the D/A conversion is used by the panel driving section 12 to drive the display panel 13. The display panel 13, thus driven, displays frame-by-frame images. This brings the image processing to an end.

Figure 8:
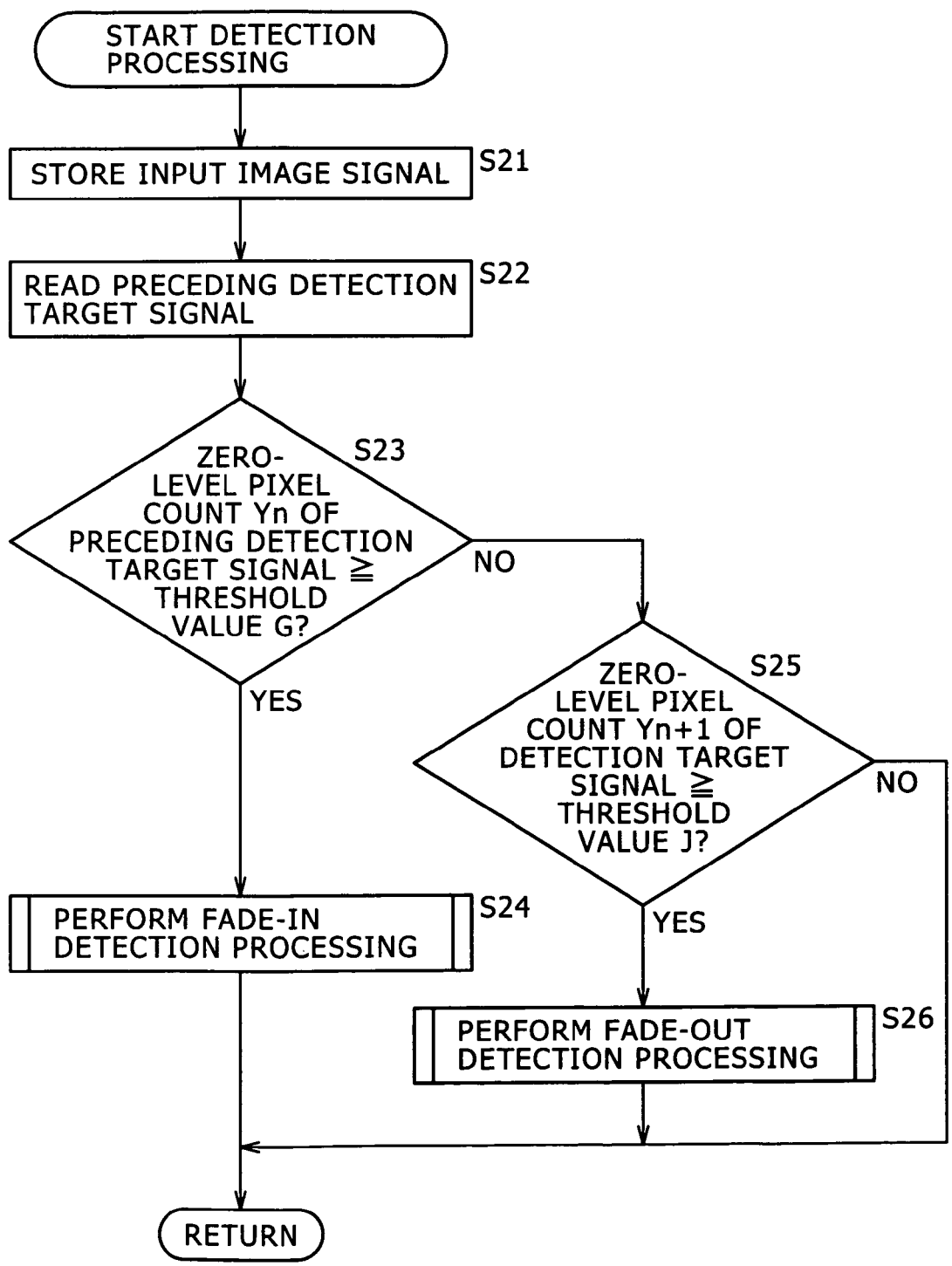
FIG. 8 is a flowchart of steps detailing the detection processing performed in step S11.

The detection processing in step S11 of FIG. 7 will now be described in more detail with reference to FIG. 8.

In step S21, the frame memory 81 of the detecting section 61 stores the input image signal supplied by the decode processing section 33. The input image signal is also fed to the determining section 82 for a check to determine whether the input image signal in question is subject to fade-in or fade-out. In the ensuing description, the input image signal targeted for detection will be referred to as the detection target signal.

In step S22, the determining section 94 reads from the frame memory 81 the input image signal one frame interval earlier than the detection target signal (the earlier signal will be referred to as the preceding detection target signal hereunder). In step S23, the determining section 94 checks to determine whether the number $Y_n$ of pixels for which the preceding detection target signal is at the zero level (called the zero-level pixel count of the preceding detection target signal) is larger than a predetermined threshold value G.

The threshold value G is the smallest number of pixels for which the frame-by-frame image signal of the first frame out of two consecutive frames is at the zero level. Where image signals are subject to fade-in, the more recent the frame, the higher the level of the corresponding image signal. That is, the more advanced the frame in time, the smaller the number of zero-level pixels in the frame. For that reason, the threshold value G is set to represent the smallest number of zero-level pixels prior to a decrease in the zero-level pixel count between two consecutive frames.

If in step S23 the zero-level pixel count $Y_n$ of the preceding detection target signal is found to be larger than the threshold value G, i.e., if the zero-level pixel count $Y_n$ of the preceding detection target signal indicates the possibility of the detection target signal being subject to fade-in, then step S24 is reached. In step S24, the determining section 82 performs fade-in detection processing that involves checking to determine whether the detection target signal is actually subject to fade-in. The fade-in detection processing will be discussed later in more detail with reference to FIG. 9. From step S24, control is returned to step S11 in FIG. 7.

If in step S23 the zero-level pixel count $Y_n$ of the preceding detection target signal is not found to be larger than the threshold value G, i.e., if the zero-level pixel count $Y_n$ of the preceding detection target signal indicates little possibility of the detection target signal being subject to fade-in, then step S25 is reached.

In step S25, the determining section 94 checks to determine whether the number $Y_{n+1}$ of pixels for which the detection target signal is at the zero level (called the zero-level pixel count of the detection target signal) is larger than a predetermined threshold value J.

The threshold value J is the smallest number of pixels for which the frame-by-frame image signal of the second frame out of two consecutive frames is at the zero level. Where image signals are subject to fade-out, the more recent the frame, the lower the level of the corresponding image signal. That is, the more advanced the frame in time, the larger the number of zero-level pixels in the frame. The threshold value J is therefore set to represent the smallest number of zero-level pixels subsequent to the increase in the zero-level pixel count between two consecutive frames.

If in step S25 the zero-level pixel count $Y_{n+1}$ of the detection target signal is found to be larger than the threshold value J, i.e., if the zero-level pixel count $Y_{n+1}$ of the detection target signal indicates the possibility of the detection target signal being subject to fade-out, then step S26 is reached. In step S26, the determining section 82 performs fade-out detection processing that involves checking to determine whether the detection target signal is actually subject to fade-out. The fade-out detection processing will be discussed later in more detail with reference to FIG. 10. From step S26, control is returned to step S11 in FIG. 7.

If in step S25 the zero-level pixel count $Y_{n+1}$ of the detection target signal is not found to be larger than the threshold value J, i.e., if both the zero-level pixel count $Y_n$ of the preceding detection target signal and the zero-level pixel count $Y_{n+1}$ of the detection target signal indicate that the detection target signal is not likely to be subject to fade-in or fade-out, then the determining section 82 determines that the detection target signal is not subject to fade-in or fade-out. From step S25, control is returned to step S11 in FIG. 7.

Figure 9:
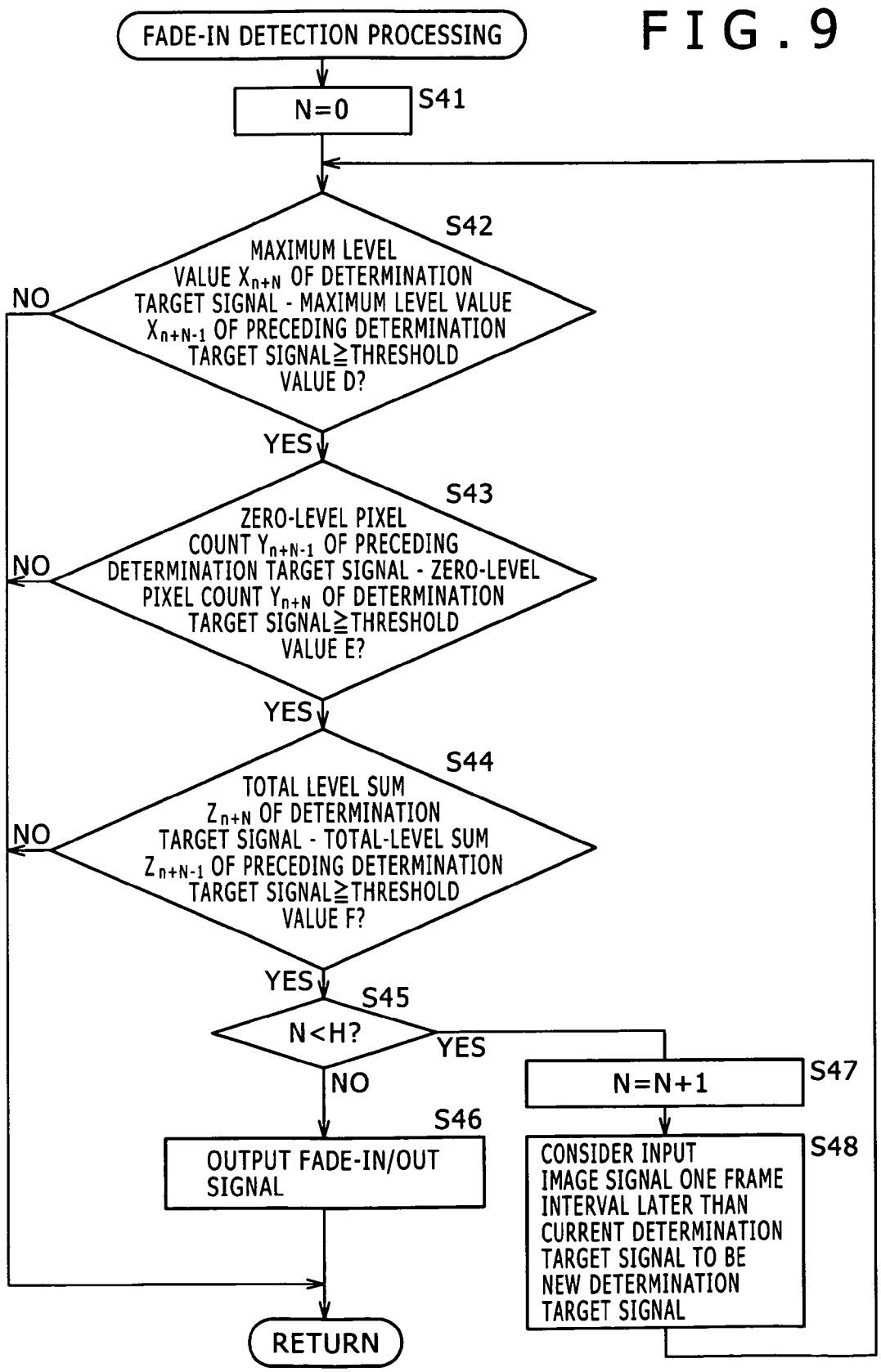
FIG. 9 is a flowchart of steps detailing the fade-in detection processing performed in step S24.

The fade-in detection processing in step S24 of FIG. 8 will now be described in detail with reference to FIG. 9.

In step S41, the determining section 82 sets a count value N to zero. The determining section 82 considers the detection target signal to be the input image signal targeted for determination (called the determination target signal) in the fade-in or fade-out detection processing.

In step S42, the determining section 82 checks to determine whether the maximum level value $X_{n+N}$ of the determination target signal, minus the maximum level value $X_{n+N-1}$ of the input image signal one frame interval earlier than the determination target signal (called the preceding determination target signal), is larger than a predetermined threshold value D.

Illustratively, in step S42 the first time round, the determining section 82 checks to determine whether the maximum level value $X_n$ of the determination target signal supplied by the decode processing section 33 as the input image signal considered the detection target signal, minus the maximum level value $X_{n-1}$ of the preceding determination target signal retrieved from the frame memory 81 as the preceding detection target signal, is larger than the threshold value D.

The threshold value D represents the smallest value of a maximum level difference between the frame-by-frame image signals of two consecutive frames subject to fade-in. Where image signals are subject to fade-in, the more recent the frame, the higher the level of the corresponding image signal. The threshold value D is therefore set to denote the smallest increment of a maximum level increase between frames.

If in step S42 the maximum level value $X_{n+N}$ of the determination target signal minus the maximum level value $X_{n+N-1}$ of the preceding determination target signal is not found to be larger than the predetermined threshold value D, that means there is little possibility of the detection target signal being subject to fade-in. In that case, the determining section 82 determines that the detection target signal is not subject to fade-in, and control is returned to step S11 in FIG. 7.

If in step S42 the maximum level value $X_{n+N}$ of the determination target signal minus the maximum level value $X_{n+N-1}$ of the preceding determination target signal is found to be larger than the predetermined threshold value D, that means there is the possibility of the detection target signal being subject to fade-in. In that case, control is passed on to step S43.

In step S43, the determining section 82 checks to determine whether the number $Y_{n+N-1}$ of pixels for which the preceding determination target signal is at the zero level (called the zero-level pixel count of the preceding determination target signal), minus the number $Y_{n+N}$ of pixels for which the determination target signal is at the zero level (called the zero-level pixel count of the determination target signal), is larger than a predetermined threshold value E.

The threshold value E is the smallest number of a pixel count difference between the frame-by-frame image signals of two consecutive frames. Where image signals are subject to fade-in, the more recent the frame, the smaller the zero-level pixel count of the corresponding image signal. The threshold value E is therefore set to denote the smallest increment of a maximum pixel count decrease between frames.

If in step S43 the zero-level pixel count $Y_{n+N-1}$ of the preceding determination target signal minus the zero-level pixel count $Y_{n+N}$ of the determination target signal is not found to be larger than the predetermined threshold value E, i.e., if there is little change in the zero-level pixel count between the preceding determination target signal and the determination target signal, that means there is little possibility of the detection target signal being subject to fade-in. In that case, the determining section 82 determines that the detection target signal is not subject to fade-in, and control is returned to step S11 in FIG. 7.

If in step S43 the zero-level pixel count $Y_{n+N-1}$ of the preceding determination target signal minus the zero-level pixel count $Y_{n+N}$ of the determination target signal is found to be larger than the predetermined threshold value E, that means there is the possibility of the detection target signal being subject to fade-in. In that case, control is passed on to step S44.

In step S44, the determining section 82 checks to determine whether the total sum $Z_{n+N}$ of all pixel levels of the determination target signal (called the total level sum of the determination target signal), minus the total sum $Z_{n+N-1}$ of all pixels of the preceding determination target signal (called the total level sum of the preceding determination target signal), is larger than a threshold value F.

The threshold value F is the smallest value of the difference between the total pixel level sums of the frame-by-frame image signals of two consecutive frames subject to fade-in. Where image signals are subject to fade-in, the more recent the frame, the higher the level of the corresponding image signal. The threshold value F is therefore set to represent the smallest increment of the increase in the total sum of all pixels between frames.

If in step S44 the total level sum $Z_{n+N}$ of the determination target signal minus the total level sum $Z_{n+N-1}$ of the preceding determination target signal is not found to be larger than the threshold value F, that means there is little possibility of the detection target signal being subject to fade-in. In that case, the determining section 82 determines that the detection target signal is not subject to fade-in, and control is returned to step S11 in FIG. 7.

If in step S44 the total level sum $Z_{n+N}$ of the determination target signal minus the total level sum $Z_{n+N-1}$ of the preceding determination target signal is found to be larger than the threshold value F, that means there is the possibility of the detection target signal being subject to fade-in. In that case, control is passed on to step S45. In step S45, the determining section 82 checks to determine whether the count value N is smaller than a predetermined value H. The value H is the value obtained by subtracting 1 from the number of frames in the determination target signal necessary for determining whether the detection target signal is subject to fade-in.

If in step S45 the count value N is found to be smaller than the value H, then step S47 is reached. In step S47, the determining section 82 increments the count value N by 1. In step S48, the determining section 82 considers the input image signal one frame interval later than the current determination target signal to be the new determination target signal. From step S48, control is returned to step S42 and the subsequent steps are repeated until the count value N becomes at least equal to the value H.

If in step S45 the count value N is found not smaller than the value H, i.e., if the count value N is found to be equal to or larger than the value H, then step S46 is reached. In step S46, the determining section 82 outputs a fade-in/out signal for the detection target signal. From step S46, control is returned to step S11 in FIG. 7.

As described, the determining section 82 determines whether the detection target signal is subject to fade-in by performing the checks in steps S42 through S44 using signals ranging from the preceding detection target signal one frame interval earlier than the detection target signal, to the input image signal H+1 frame intervals later than the detection target signal.

The checks in steps S42 through S44, aimed at detecting the level of the determination target signal and that of the preceding determination target signal, can be performed by the determining section 82 with circuits of a limited scale. It is thus possible for the image processing section 51 to determine whether the detection target signal is subject to fade-in, without recourse to circuitry of an inordinately large scale.

The determining section 82 need not carry out all steps S42 through S44. Alternatively, one or two of these checks may be carried out instead.

Figure 10:
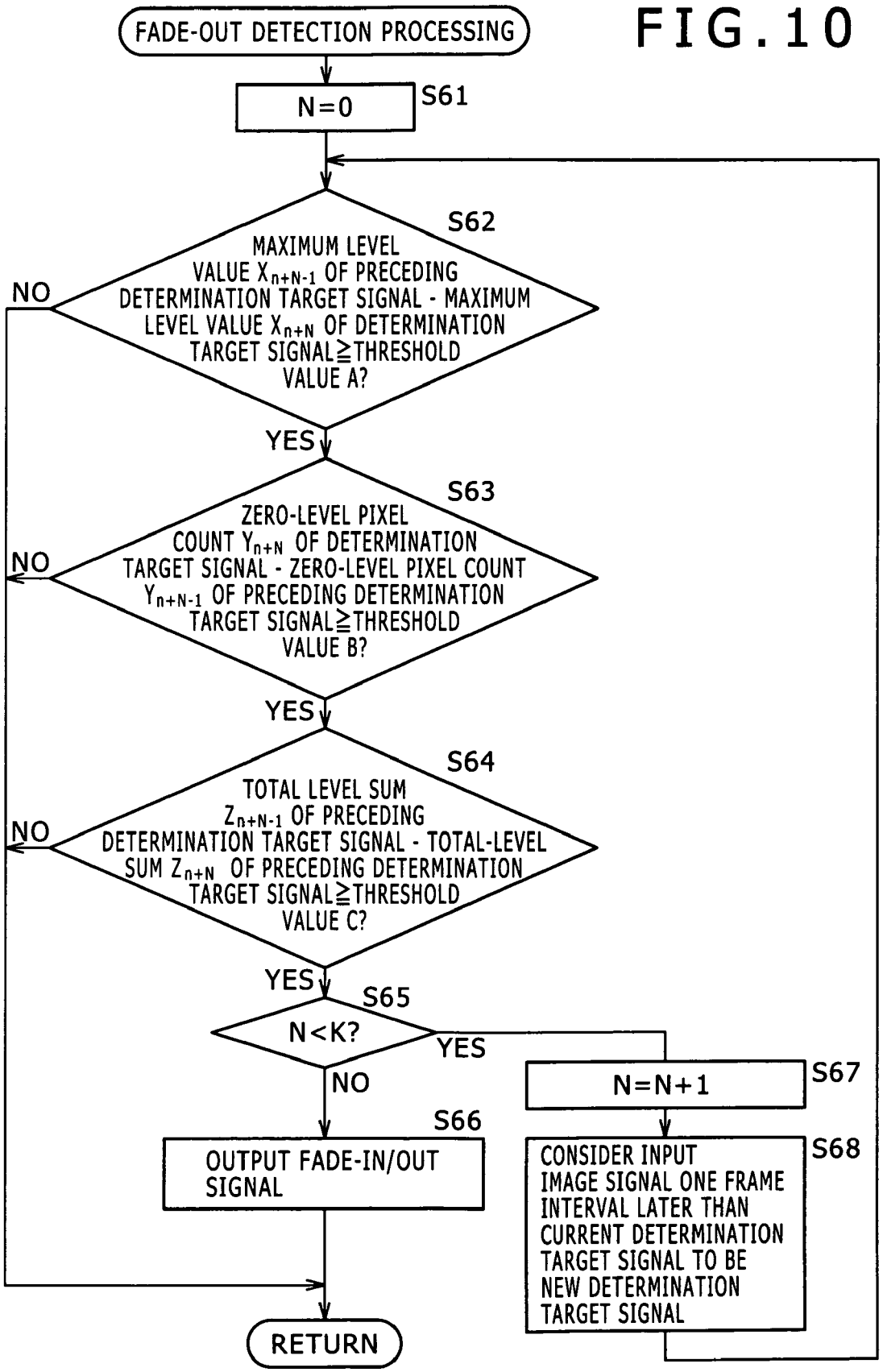
FIG. 10 is a flowchart of steps detailing the fade-out detection processing performed in step S26.

The fade-out detection processing in step S26 of FIG. 8 will now be described in detail with reference to FIG. 10.

In step S61, the determining section 82 sets the count value N to zero. The determining section 82 considers the detection target signal to be the determination target signal.

In step S62, the determining section 82 checks to determine whether the maximum level value $X_{n+N-1}$ of the preceding determination target signal minus the maximum level value $X_{n+N}$ of the determination target signal is larger than a predetermined threshold value A.

The threshold value A denotes the smallest value of a maximum level difference between the frame-by-frame image signals of two consecutive frames subject to fade-out. Where image signals are subject to fade-out, the more recent the frame, the lower the level of the corresponding image signal. The threshold value A is therefore set to represent the smallest increment of a maximum level decrease between frames.

If in step S62 the maximum level value $X_{n+N-1}$ of the preceding determination target signal minus the maximum level value $X_{n+N}$ of the determination target signal is not found to be larger than the threshold value A, that means there is little possibility of the detection target signal being subject to fade-out. In that case, control is returned to step S11 in FIG. 7.

If in step S62 the maximum level value $X_{n+N-1}$ of the preceding determination target signal minus the maximum level value $X_{n+N}$ of the determination target signal is found to be larger than the threshold value A, that means there is the possibility of the detection target signal being subject to fade-out. In that case, control is passed on to step S63.

In step S63, the determining section 82 checks to determine whether the zero-level pixel count $Y_{n+N}$ of the determination target signal minus the zero-level pixel count $Y_{n+N-1}$ of the preceding determination target signal is larger than a predetermined threshold value B. The threshold value B represents the smallest value of a zero-level pixel count difference between the frame-by-frame image signals of two consecutive frames subject to fade-out. Where image signals are subject to fade-out, the more recent the frame, the larger the number of zero-level pixels in the frame. The threshold value B is therefore set to denote the smallest increment of the zero-level pixel count increase between frames.

If in step S63 the zero-level pixel count $Y_{n+N}$ of the determination target signal minus the zero-level pixel count $Y_{n+N-1}$ of the preceding determination target signal is not found to be larger than the threshold value B, i.e., if there is little change in the zero-level pixel count between the preceding determination target signal and the determination target signal, that means there is little possibility of the detection target signal being subject to fade-out. In that case, the determining section 82 determines that the detection target signal is not subject to fade-out, and control is returned to step S11 in FIG. 7.

If in step S63 the zero-level pixel count $Y_{n+N}$ of the determination target signal minus the zero-level pixel count $Y_{n+N-1}$ of the preceding determination target signal is found to be larger than the threshold value B, that means there is the possibility of the detection target signal being subject to fade-out. In that case, control is passed on to step S64.

In step S64, the determining section 82 checks to determine whether the total level sum $Z_{n+N-1}$ of the preceding determination target signal minus the total level sum $Z_{n+N}$ of the determination target signal is larger than a threshold value C. The threshold value C denotes the smallest value of the difference between the total pixel level sums of the frame-by-frame image signals of two consecutive frames subject to fade-out. Where image signals are subject to fade-out, the more recent the frame, the lower the level of the corresponding image signal. The threshold value C is therefore set to represent the smallest increment of the decrease in the total sum of all pixels between frames.

If in step S64 the total level Sum $Z_{n+N-1}$ of the preceding determination target signal minus the total level sum $Z_{n+N}$ of the determination target signal is not found to be larger than the threshold value C, that means there is little possibility of the detection target signal being subject to fade-out. In that case, the determining section 82 determines that the detection target signal is not subject to fade-out, and control is returned to step S11 in FIG. 7.

If in step S64 the total level sum $Z_{n+N-1}$ of the preceding determination target signal minus the total level sum $Z_{n+N}$ of the determination target signal is found to be larger than the threshold value C, that means there is the possibility of the detection target signal being subject to fade-out. In that case, step S65 is reached and the determining section 82 checks to determine whether the count value N is smaller than a predetermined value K. The value K is the value obtained by subtracting 1 from the number of frames in the determination target signal necessary for determining whether the detection target signal is subject to fade-out. The value K may or may not be the same as the value H.

If in step S65 the count value N is found to be smaller than the value K, then step S67 is reached. In step S67, the determining section 82 increments the count value N by 1. In step S68, the determining section 82 considers the input image signal one frame interval later than the current determination target signal to be the new determination target signal. From step S68, control is returned to step S62 and the subsequent steps are repeated until the count value N becomes at least equal to the value K.

If in step S65 the count value N is found not smaller than the value K, i.e., if the count value N is found to be equal to or larger than the value K, then step S66 is reached. In step S66, the determining section 82 outputs a fade-in/out signal for the detection target signal. From step S66, control is returned to step S11 in FIG. 7.

As described, the determining section 82 determines whether the detection target signal is subject to fade-out by performing the checks in steps S62 through S64 using signals ranging from the preceding detection target signal one frame interval earlier than the detection target signal, to the input image signal K+1 frame intervals later than the detection target signal.

The checks in steps S62 through S64, like the checks in steps S42 through 44 aimed at detecting the level of the determination target signal and that of the preceding determination target signal, can be performed by the determining section 82 with circuits of a limited scale. It is thus possible for the image processing section 51 to determine whether the detection target signal is subject to fade-out, without recourse to circuitry of an inordinately large scale.

The determining section 82 need not carry out all steps S62 through S64. Alternatively, one or two of these checks may be carried out instead.

Figure 11:
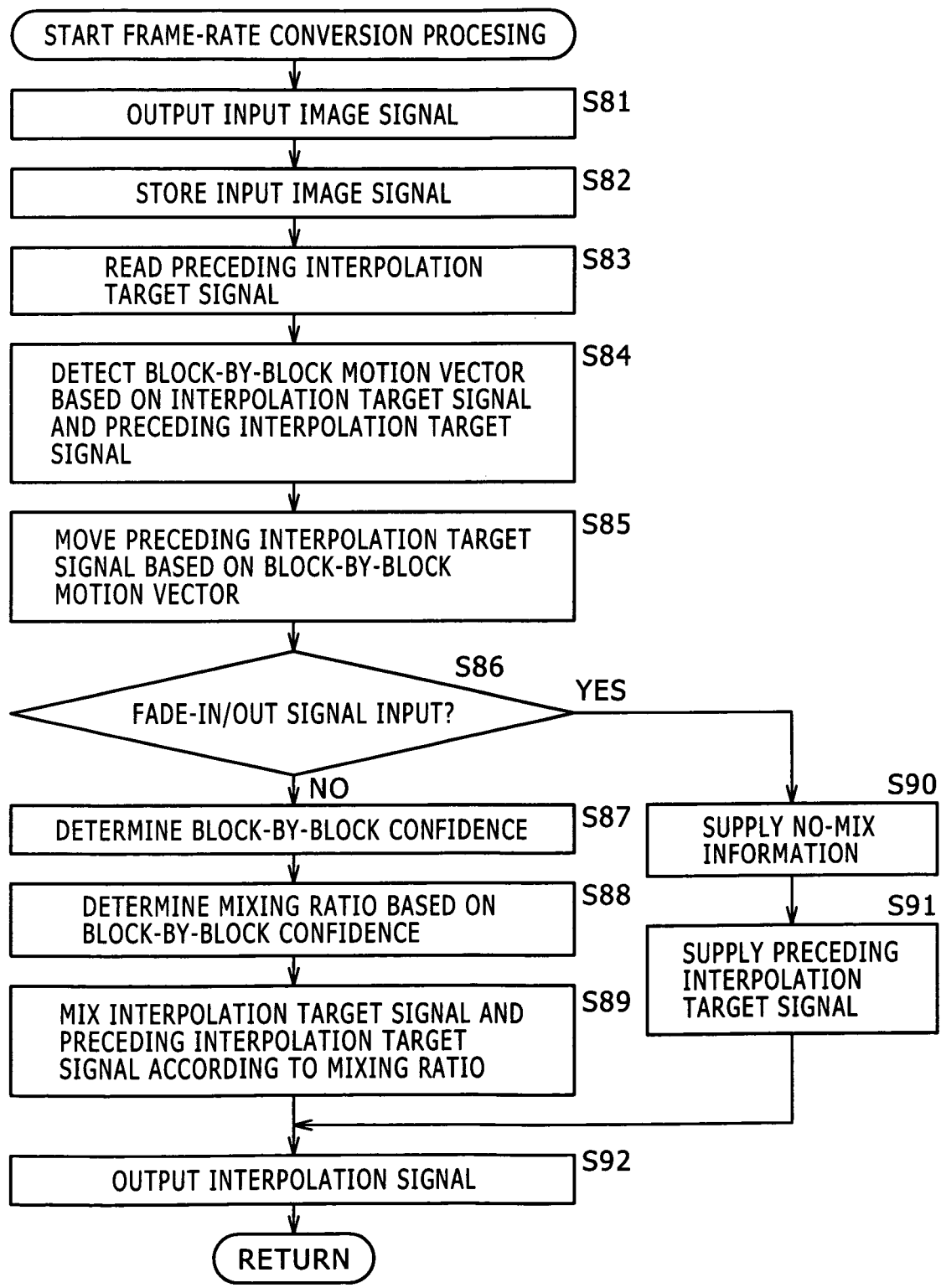
FIG. 11 is a flowchart of steps detailing the frame rate conversion processing performed in step S12.

The frame rate converting process in step S12 of FIG. 7 will now be described in detail with reference to FIG. 11.

In step S81, the selecting section 96 in the frame rate converting section 62 outputs the input image signal from the decode processing section 33 as the interpolated image signal. In step S82, the frame memory 91 stores the input image signal coming from the decode processing section 33. In step S83, the frame memory 91 reads the input image signal which has been in storage and which was received one frame interval earlier than the input image signal stored in step S82, and considers the retrieved signal to be the preceding interpolation target signal. The preceding interpolation target signal thus retrieved is fed to the detecting section 92, moving section 93, and mixing section 95.

In step S84, given the input image signal from the decode processing section 33 as the interpolation target signal, the detecting section 92 detects a block-by-block motion vector of the interpolation target signal based on both the interpolation target signal and the preceding interpolation target signal supplied by the frame memory 91. The block-by-block motion vector thus detected is sent by the detecting section 92 to the moving section 93 and determining section 94.

In step S85, based on the block-by-block motion vector supplied by the detecting section 92, the moving section 93 moves in block-by-block fashion the preceding interpolation target signal supplied by the frame memory 91. The moved preceding interpolation target signal is forwarded to the mixing section 95.

In step S86, the determining section 94 checks to determine whether a fade-in/out signal for the interpolation target signal is input from the determining section 82 of the detecting section 61. More specifically, the fade-in/out signal output in step S46 of FIG. 9 or in step S66 of FIG. 10 with regard to the detection target signal is typically furnished with information (e.g., frame number) for identifying that detection target signal. The determining section 94 checks to determine whether the fade-in/out signal is input supplemented with the information for identifying the interpolation target signal.

If in step S86 the fade-in/out signal for the interpolation target signal is not found to be input, then step S87 is reached. In step S87, the determining section 94 determines the degree of confidence of the block-by-block motion vector based on the block-by-block motion vector value given by the detecting section 92.

In step S88, the determining section 94 determines the mixing ratio based on the block-by-block degree of confidence determined in step S87. More specifically, if the block-by-block degree of confidence is high, then the determining section 94 determines a block-by-block mixing ratio such that a high proportion of the pixels from the moved preceding interpolation target signal is to be mixed. If the block-by-block degree of confidence is low, then the determining section 94 determines a block-by-block mixing ratio such that a low proportion of the pixels from the moved preceding interpolation target signal is to be mixed. The determining section 94 sends the block-by-block mixing ratio thus determined to the mixing section 95.

In step S89, based on the mixing ratio supplied by the determining section 94, the mixing section 95 mixes the interpolation target signal coming from the decode processing section 33 with the moved preceding interpolation target signal supplied by the moving section 93. The mixing section 95 proceeds to feed the mixed image signal to the selecting section 96 as an interpolation signal. In the manner described above, if the fade-in/out signal is not found input from the detecting section 61, then the frame rate converting section 62 performs usual interpolation.

On the other hand, if in step S86 the fade-in/out signal for the interpolation target signal is found input, then step S90 is reached. In step S90, the determining section 94 feeds no-mix information to the mixing section 95. In step S91, given the no-mix information from the determining section 94, the mixing section 95 allows the preceding interpolation target signal from the frame memory 91 to be fed to the selecting section 96 as the interpolation signal without modification.

As described, when the fade-in/out signal is input from the detecting section 61, the frame rate converting section 62 carries out preliminary interpolation. Whereas the interpolation target signal subject to fade-in or fade-out can give rise to inaccurate motion vector detection, the inventive method prevents generation of an interpolation signal based on an incorrect motion vector and contributes to enhancing the image quality of the image signal following interpolation.

In step S92, the selecting section 96 causes the interpolation signal coming from the mixing section 95 to be output as the interpolated image signal. Control is then returned to step S12 in FIG. 7.

In the foregoing description, the image signal interposed chronologically at midpoint between two consecutive image signals was shown to be interpolated. Alternatively, an image signal occurring at any given point in time may be interpolated.

In the foregoing description, the detecting section 61 was shown to detect whether a given input image signal is subject to fade-in or fade-out. Alternatively, the detecting section 61 may be arranged to detect time-varied changes in the level or the pixel count of the image signal representative of an object being imaged.

In this specification, the steps describing the programs stored on the program storage medium represent not only the processes that are to be carried out in the depicted sequence (i.e., on a time series basis) but also processes that may be performed parallelly or individually and not chronologically.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a detecting unit configured to detect a motion vector based on an input image signal;
a determining unit configured to determine whether said input image signal in terms of a level meets a predetermined fade-in or fade-out condition; and
an interpolating unit configured such that if said input image signal is not found to meet said predetermined condition, then said interpolating unit interpolates and outputs an input image signal intermediate signal interposed at a predetermined point in time between said input image signal and a preceding input image signal that precedes said input image signal, in accordance with said motion vector, and if said input image signal is found to meet said predetermined condition, then said interpolating unit allows said input image signal to be output unchanged as said input image signal intermediate signal.

2. The image processing apparatus according to claim 1, wherein said determining unit determines whether said input image signal meets said predetermined condition based on a time-varied change in at least one of factors representing a maximum level of said input image signal, the number of pixels for which said input image signal is at a zero level, and a total level sum of said input image signal at varying points in time.

3. The image processing apparatus according to claim 1, wherein, if the number of pixels for which either said input image signal or said preceding input image signal is at a zero level is larger than a predetermined number, then said determining unit determines whether said input image signal meets said predetermined condition based on a time-varied change in at least one of factors representing a maximum level of said input image signal, the number of pixels for which said input image signal is at a zero level, and a total level sum of said input image signal at varying points in time.

4. An image processing method for use with an image processing apparatus for interpolating an input image signal, said image processing method comprising the steps of:
detecting a motion vector based on said input image signal;

determining whether said input image signal in terms of a level thereof meets a predetermined fade-in or fade-out condition;

if said input image signal is not found to meet said predetermined condition, then interpolating and outputting an input image signal intermediate signal interposed at a predetermined point in time between said input image signal and a preceding input image signal that precedes said input image signal, in accordance with said motion vector; and if said input image signal is found to meet said predetermined condition, then allowing said input image signal to be output unchanged as said input image signal intermediate signal.

5. A program configured to causing a computer to perform an image processing procedure for interpolating an input image signal, said image processing procedure comprising the steps of:

detecting a motion vector based on said input image signal;

determining whether said input image signal in terms of a level thereof meets a predetermined fade-in or fade-out condition;

if said input image signal is not found to meet said predetermined condition, then interpolating and outputting an input image signal intermediate signal interposed at a predetermined point in time between said input image signal and a preceding input image signal that precedes said input image signal, in accordance with said motion vector; and if said input image signal is found to meet said predetermined condition, then allowing said input image signal to be output unchanged as said input image signal intermediate signal.

6. An image processing apparatus comprising:

detecting means for detecting a motion vector based on an input image signal;

determining means for determining whether said input image signal in terms of a level meets a predetermined fade-in or fade-out condition; and interpolating means that if said input image signal is not found to meet said predetermined condition, then said interpolating means interpolates and outputs an input image signal intermediate signal interposed at a predetermined point in time between said input image signal and a preceding input image signal that precedes said input image signal, in accordance with said motion vector, and if said input image signal is found to meet said predetermined condition, then said interpolating means allows said input image signal to be output unchanged as said input image signal intermediate signal.

* * * * *